United States Patent
Rankin (12) 
(10) Patent No.: US 11,516,048 B2
(45) Date of Patent: Nov. 29, 2022

(54) DISTRIBUTION OF DATA OVER A NETWORK WITH INTERCONNECTED RINGS

(71) Applicant: John Rankin, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 41 days.

(21) Appl. No.: 17/126,175

(22) Filed: Dec. 18, 2020

(65) Prior Publication Data

US 2021/0194723 A1    Jun. 24, 2021

Related U.S. Application Data

(60) Provisional application No. 62/949,722, filed on Dec. 18, 2019.

(51) Int. Cl.
| | |
|---|---|
| G06F 15/173 | (2006.01) |
| H04L 12/42 | (2006.01) |
| H04L 45/74 | (2022.01) |
| H04L 9/40 | (2022.01) |

(52) U.S. Cl.
CPC .............. *H04L 12/42* (2013.01); *H04L 45/74* (2013.01); *H04L 63/123* (2013.01)

(58) Field of Classification Search
CPC ....................................................... H04L 12/42
See application file for complete search history.

(56) References Cited

U.S. PATENT DOCUMENTS

| | | | |
|---|---|---|---|
| 7,461,128 B2 * | 12/2008 | Anderson | H04L 69/163 709/219 |
| 8,090,866 B1 | 3/2012 | Bashyam et al. | |
| 8,577,038 B2 | 11/2013 | Kameda et al. | |
| 8,737,198 B1 * | 5/2014 | Holness | H04L 45/28 370/222 |
| 10,728,220 B2 | 7/2020 | Rankin | |
| 2002/0114341 A1 * | 8/2002 | Sutherland | H04L 41/00 370/428 |

(Continued)

OTHER PUBLICATIONS

Mistree, B., PingFS, https://bmistree.com/pingfs/, pp. 1-27, Dec. 5, 2019.

(Continued)

*Primary Examiner* — Guang W Li
(74) *Attorney, Agent, or Firm* — Standley Law Group LLP; Jeffrey S. Standley; Adam J. Smith (57) ABSTRACT

Systems and methods distributing data within a network for long-term storage are provided. Confederate host computers are arranged into interconnected rings by bridging confederate host computers. Payloads are routed through the network to a respective one of the rings associated with a respective one of the ring identifiers matching the identifier of the respective data payload for storage. Preferably, the bridging confederate host computers identify a destination ring for the payloads, transmit the payload to a next confederate host computer in a current ring where an identifier for the payload matches a ring identifier for the current ring, and transmit the payload to a next confederate host computer in a connected ring where the identifier associated with the payload does not match the ring identifier for the current ring.

19 Claims, 4 Drawing Sheets

(56) References Cited

U.S. PATENT DOCUMENTS

| | | | |
|---|---|---|---|
| 2003/0223582 A1 | 12/2003 | Dagan | |
| 2004/0210763 A1 | 10/2004 | Jonas | |
| 2005/0058129 A1 | 3/2005 | Jones et al. | |
| 2005/0105506 A1 | 5/2005 | Birdwell et al. | |
| 2007/0025388 A1 | 2/2007 | Abhishek et al. | |
| 2007/0283125 A1 | 12/2007 | Manczak et al. | |
| 2008/0084863 A1* | 4/2008 | Springer | H04L 12/42 370/389 |
| 2008/0104313 A1 | 5/2008 | Chu | |
| 2008/0317030 A1* | 12/2008 | Rhee | H04L 12/427 370/392 |
| 2010/0281257 A1 | 11/2010 | Yamazaki et al. | |
| 2011/0064088 A1* | 3/2011 | Kawarai | H04L 12/42 370/401 |
| 2011/0231630 A1 | 9/2011 | Dannowski et al. | |
| 2011/0238793 A1 | 9/2011 | Bedare et al. | |
| 2012/0117376 A1* | 5/2012 | Fink | H04L 69/22 713/153 |
| 2012/0243539 A1 | 9/2012 | Keesara | |
| 2013/0166701 A1* | 6/2013 | Todorov | H04L 67/34 709/224 |
| 2014/0025806 A1 | 1/2014 | Robitaille et al. | |
| 2015/0113028 A1 | 4/2015 | Boppana et al. | |
| 2015/0381408 A1* | 12/2015 | Kompella | H04L 45/12 370/222 |
| 2016/0077976 A1 | 3/2016 | Raikin et al. | |
| 2016/0241388 A1 | 8/2016 | Ross | |
| 2016/0269294 A1 | 9/2016 | Rankin | |
| 2016/0366160 A1 | 12/2016 | Kapoor et al. | |
| 2017/0041296 A1 | 2/2017 | Ford et al. | |
| 2017/0310544 A1* | 10/2017 | Woodward | H04L 41/0663 |
| 2017/0351575 A1* | 12/2017 | Baker | G06F 3/0632 |
| 2018/0198642 A1* | 7/2018 | Regev | H04L 12/42 |
| 2020/0241960 A1 | 7/2020 | Yanovsky et al. | |
| 2020/0379834 A1* | 12/2020 | Rankin | G06F 11/0751 |
| 2022/0091992 A1* | 3/2022 | Shanbhogue | G06F 12/0895 |

OTHER PUBLICATIONS

Brown, J. et al., ARP Coaching Poisoning and Routing Loops in ad Hoc Networks, Mobile Networks and Applications, pp. 1306-1317, 2018.

Hansen, R. et al., Covert6: A Tool to Corroborate the Existence of IPv6 Covert Channels, Annual ADFSL Conference on Digital Forensics, Security Law, 2016.

Mileva, A. et al., Covert Channels in TCP/IP Protocol Stack—extended version—, Central European Journal of Computer Science, 2000.

York, D., Flooding Attack, Science Direct, 2021.

* cited by examiner

FIG. 4 understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.
DISTRIBUTION OF DATA OVER A NETWORK WITH INTERCONNECTED RINGS

CROSS-REFERENCE TO RELATED APPLICATIONS

This application claims the benefit of U.S. provisional patent application Ser. No. 62/949,722 filed Dec. 18, 2019, the disclosures of which are hereby incorporated by reference as if fully restated herein.

TECHNICAL FIELD

Exemplary embodiments relate generally to systems and methods for the distribution of data over a network with interconnected rings.

BACKGROUND AND SUMMARY OF THE INVENTION

Traditionally, information and data are stored within a common repository. This storage facility, which may be a server or servers, may function as a central location where information is stored and from which information can be retrieved. Alternatively, information may be stored within a moving communication path of a network. For example, without limitation, a ring of hosts may be established that is configured to continually pass information though the ring until interrupted. Such rings may be established where the confederate hosts in the ring are unaware of their participation by triggering certain communication protocols, such as ICMP error message protocols, through the use of blind hosts. In such rings, it is important to govern and manage how information is stored. Furthermore, the introduction of block chain technology has provided the potential for an ever-growing block of information travelling through a network that contains information. Such block chains may continue to grow and be passed from recipient to recipient without concern for the chain's size or exhaustion of network resources.

What is needed is a system and method where information may be distributed over a network and stored in separate components. Rather than developing duplicate repositories or moving blocks of continuously transmitting data, these systems and methods may distribute the data while providing an efficient and organized retrieval mechanism. In this regard, systems and methods for distribution of data over a network with interconnected rings are provided. Data may be distributed over a network for the purpose of storage while providing retrieval that utilizes the distribution for distributing the data in an organized fashion, rather than consolidating the information. This may be accomplished by establishing a number of interconnected rings. Each ring may comprise a number of networked computers in communication with one another. Each ring may maintain and control the information distributed within the ring. Each ring may connect and interact with the other rings by way of a bridge or gateway between the rings.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
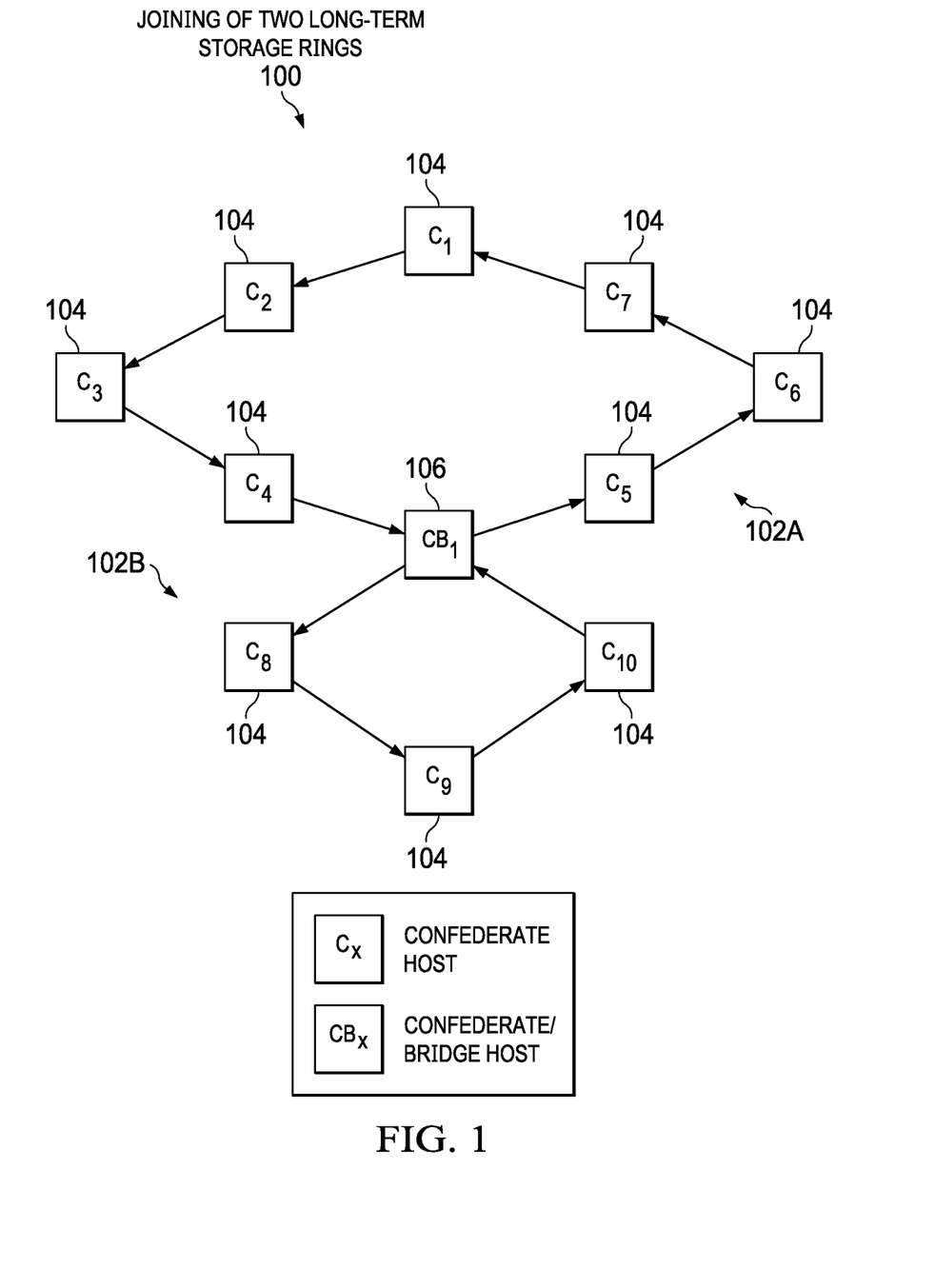
FIG. 1 is a plan view of an exemplary network of interconnected rings.

FIG. 1 is a plan view of an exemplary network 100 of interconnected rings 102A and 102B. A first ring 102A may be established. A second ring 102B may be established. Any number of rings 102 may be established. Each ring 102 may comprise a number of networked computers 104, 106. Confederate computers 104, 106 within the network 100 may be labeled $C_1$-$C_{10}$ in FIG. 1. Any number of computers 104, 106 in any number of rings 102 may be utilized. The same or a different number of computers 104, 106 may be used in each ring 102. A particular one of the confederate computers may serve as a bridge 106 between the rings 102A and 102B. The bridging confederate computer 106 may be labeled as CB1 in FIG. 1. Where more than two rings 102 are established, more than one bridging confederate computer 106 may be established so that each of the rings 102 may be interconnected. Blind hosts may be placed between each confederate member 104, 106 and may be used as unwitting intermediaries between various confederate members 104, 106.

The network 100 of rings 102 may be configured to store and manage data bits 109. Each confederate computer 104, 106 may be part of the larger network 100. Each confederate computer 104, 106 may use wired or wireless electrical communication, or combinations thereof, such as but not limited to radio traffic to communicate with one another. For example, each of the computers 104, 106 may be connected to one another through one or more internets, intranets, local area networks, the world wide web, cellular networks, combinations thereof, or the like. Each of the confederate computers 104, 106 may be configured to recognize data bits 109 to be preserved, and may be configured to pass these data bits 109 to the next confederate computer 104, 106 in the ring 102. Such identification may be made, for example without limitation, by identification of certain markers in the header or other portion of the data bits 109. Such data passing in the rings 102 may be accomplished by transmitting data bits 109 comprising a header 108 configured to trigger certain communication protocols, such as ICMP error message protocols. The headers 108 of such data bits 109 may be intentionally modified to trigger such protocols. As the rings 102 may be arranged in a continuous path, such as a circle or loop, the data may remain preserved within the ring 102, as it may always be travelling forward in an enclosed ring 102 of confederates 104, 106. Stated another way, each of the rings 102 may have a last computer 104, 106 connected to a first computer 104, 106 in the ring to form such a continuous pathway, though no specific number of computers 104, 106 of shape of such rings 102 is required.

Figure 2:
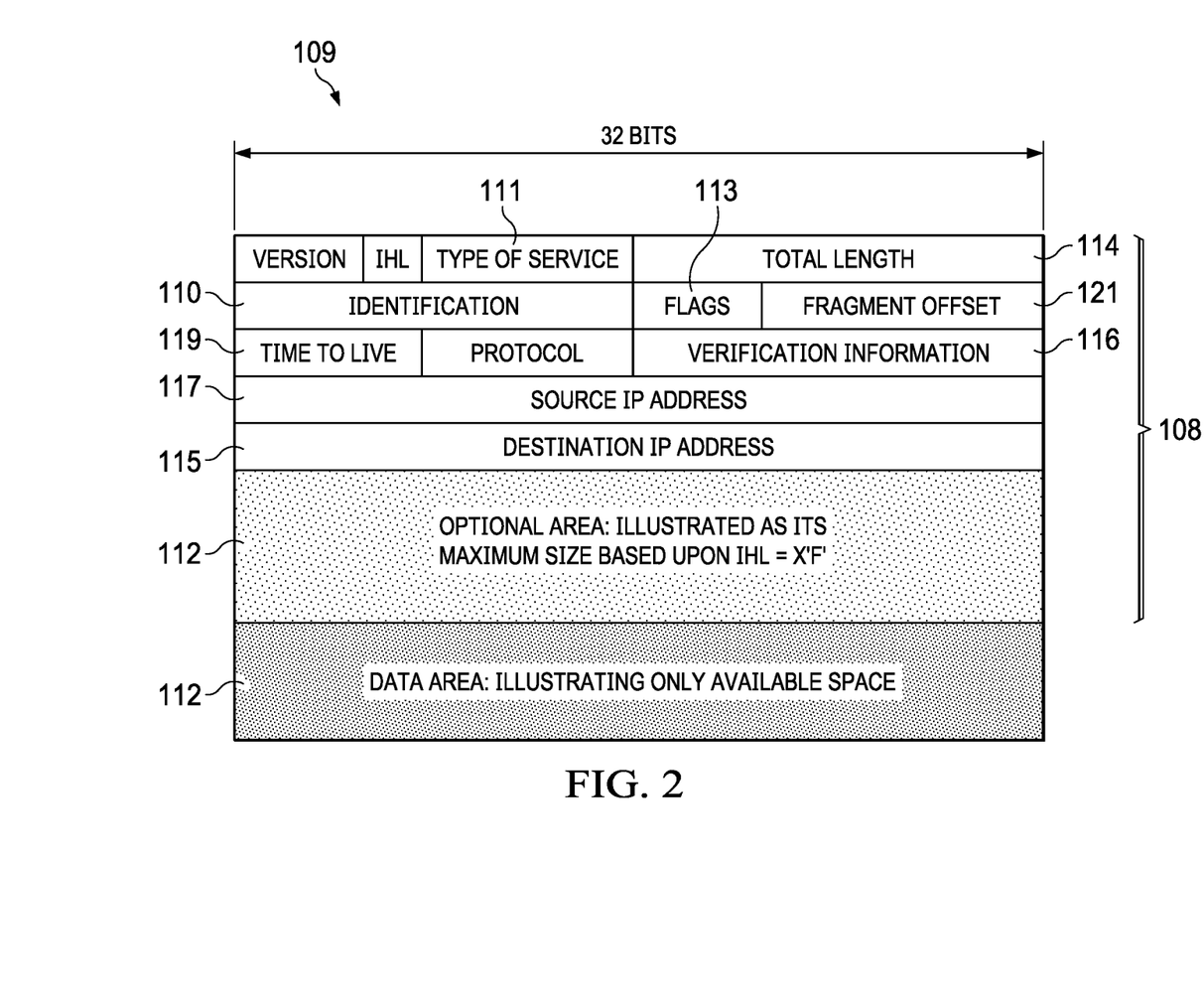
FIG. 2 is a simplified diagram of an exemplary data transmission for use with the network.

FIG. 2 is an illustration of an exemplary data bit 109 for use in the network 100. Each transmission 109 travelling in one of the rings 102 may be identified by a header 108 that contains one or more of the following elements:

1. An identifier 110 that uniquely identifies the data bit 109 is to be held in the network 100. The identifier 110 may isolate the underlying data and information 112 that can be used for separation and distribution. Each data bit 109 travelling through the network 100 may be tagged so that the underlying data and information 112 may be identified, processed, collected, and distributed.

2. A second identifier 114 that indicates the type and length of data 112 contained in the travelling data piece 109. The underlying data and information 112 may not be so variable in content that it is unclear how it might be used.

3. Verification information 116, such as a check sum or hash value, may be used to ensure the integrity of the data bit 109. Without quality assurances for the information, the effective value of the data bit 109 may come into question.

Each of the rings 102 may be connected with a bridge or gateway 106. The bridge 106 may be configured to isolate and separate traffic that is to be distributed to a different ring 102. As data bits 109 travel through the rings 102, the identification 110 portion of the data bit 109 may comprise information regarding the underlying contents 112 of the data bit 109. Therefore, as the data bit 109 meets a bridge 106, the bridge 106 may be configured to pass the information 112 over the connection until it reaches a ring 102 that is designed to hold the particular data bit 109. If the data bit 109 is already in the proper ring 102, the bridge 106 may be configured to keep the data bit 109 in the ring 102. The bridge 106 may make such routing decisions based on information in the data bit 109, such as the identification portion 110 of the data bit 109 which may indicate the desired location of the data bit 109.

Figure 3:
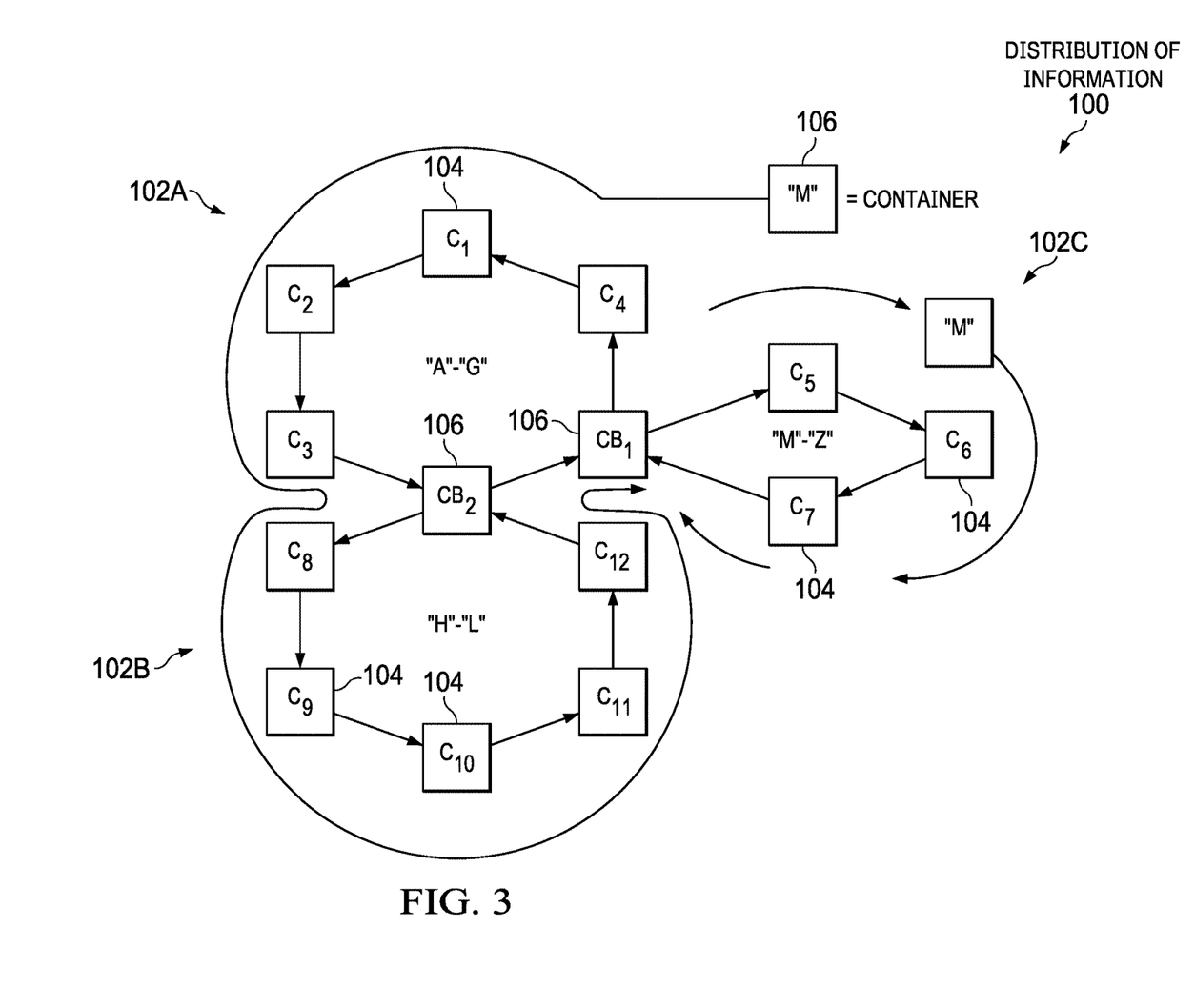
FIG. 3 is a plan view of another exemplary network of interconnected rings, illustrating an exemplary flow of information through the rings.

FIG. 3 is a plan view of another exemplary network 100 of interconnected rings 102, illustrating an exemplary flow of information through the rings 102. As illustrated for example, without limitation, a given data bit 109 may comprise an identification element 110 of "M". The use of "M" is for an illustrative example and is not intended to be limiting. Any alphanumerical or other reference identifier may be utilized. As the data bit 109 enters the network 100, it may be passed between the various rings 102A-C, based upon the criteria provided by the bridging hosts 106. As is illustrated, the data bit 109 may be passed through multiple rings 102 within the network 100 until it finally reaches its end storage rings 102, where it may remain in relatively long-term storage by continually circling the ring 102, indefinitely or for any length of time. In the given example, the identification element 110 may destine the data bit 109 for ring 102C, however, the data bit 109 may first pass through the rings 102A and 102B as illustrated by the arrows in FIG. 3 before arriving at ring 103C for relatively long-term storage. Any type or kind of identification 110 is contemplated. Any number of data bits 109 may be stored in such a manner among and between any number of interconnected rings 102.

This may permit data bit 109 to be stored and distributed throughout the many rings 102 of the network 100, without requiring duplication or unnecessary redundancy. Information passes from ring 102 to ring 102 until it meets at an identified ring 102 (e.g., 102A, 102B, or 102C), which may be configured to contain certain data. The data contained within a particular ring 102 may have certain common characteristics, such as being directed to the same or related subject matter, though such is not required. Furthermore, information may enter or exit this distributed network 100 at any point, and may be transferred and consolidated automatically without user knowledge of the network 100 configuration or potential location. Again, such data passing may be accomplished by transmitting data bits 109 comprising a modified header 108 configured to trigger certain communication protocols, such as ICMP error message protocols, in blind hosts so that no compromise of the origin or location of confederates 104, 106 is provided while achieving the distribution and storage. An example of such a technique, without limitation, is as provided in U.S. Pat. No. 10,728,220 issued Jul. 28, 2020. Another example of such a technique includes providing an indication that more fragments of a larger message should be expected, but only transmitting a single fragment such that the blind host believes the message to be sent in error. Such an indication may be provided by a more fragments flag in a header of the transmission.

Figure 4:
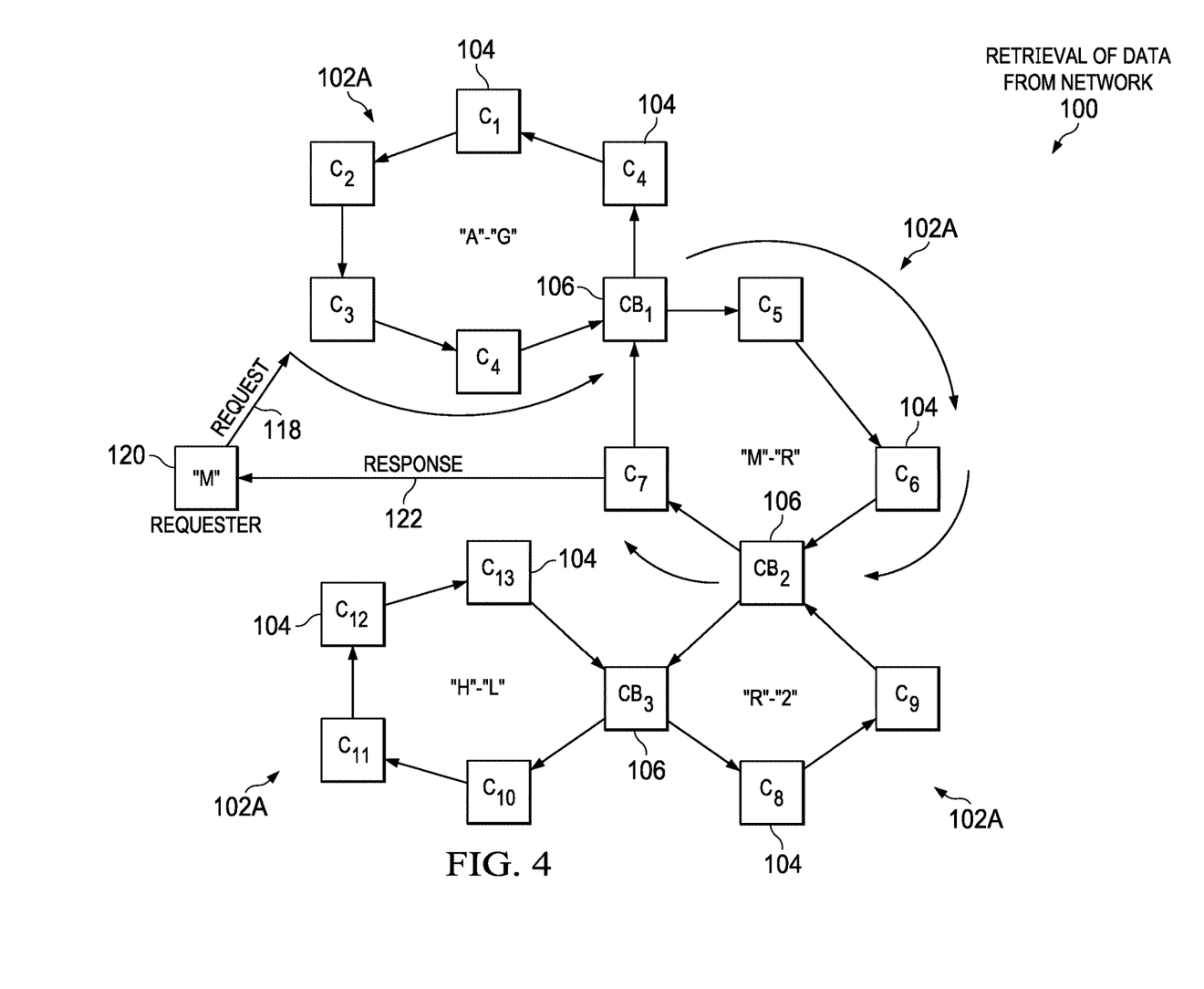
FIG. 4 is a plan view of another exemplary network of interconnected rings, illustrating the retrieval of data from the network.

FIG. 4 is a plan view of another exemplary network 100 of interconnected rings 102A, B, C, and D, illustrating the retrieval of data bits 109 from the network 100. Requests for information 118 may also follow the same or similar communication path in order to locate a requested data bit 109. At any point within the network 100, a requesting host 120 may transmit an individual request for information 118. The requests 118 may enter the network 100. Since the request 118 may comprise the unique identifier 110 of the data bit 109, the data request 118 may propagate along a similar path as the information storage path followed by the data bit 109. Once within the appropriate storage ring 102, the confederates 104 of the ring 102 may be configured to select a particular confederate 104 to respond to the request 118. Once the particular confederate 104 receives the data bit 109 having a unique identifier 110 matching the request 118, the underlying information 112 may be transmitted by way of a response 122 to the requestor 120 or another destination identified in the request 118.

By distributing the data bits 109 among a network 100 of long-term storage rings 102, it is possible to amass a significant quantity of information that is not only shared effectively across the network 100, but is also efficiently stored. Storage rings 102 may utilize these techniques while maintaining storage within the process of communication. These distribution techniques may be applied against a ring 102 that contains a series of storage servers, where the data is stored within each host 104, 106, either within the ring 102 or in duplicate throughout the ring 102. The distribution and retrieval of information may function similarly.

In exemplary embodiments, data bits 109 with data 112 to be stored may be organized into rings 102 or smaller networks. Each ring 102 may contain related data and information 112. The introduction of this data and information 112 may be made at any point in the entire network 100. Likewise, requests for information retrieval may be introduced at any point in the entire network 100. The communication network 100 may be established between participating hosts/servers/computers 104 where each participant 104 can communicate using wired or wireless connections, or combinations thereof.

The network 100 may be arranged into rings 102 by communication paths. The multiple rings 102 may be connected together through a bridges or gateways 106. Each network 100 ring 102 may act as a relatively long-term storage facility for data 112. Information 112 stored in the ring 102 may comprise, or otherwise be associated with, a unique identifier, such as in the header 108 or other portion of the datagram 109, that is associated with the information 112. The type 111, use, and/or length 114 of the datagram 109 may be provided in the unique identifier. The use identification may be made at the flags 113, though such is not required. Verification 116 necessary to ensure the integrity of the data and information 112 may be provided, such as in the header 108. The data and information 112 may be provided in a datagram 109 having such a header 108. Any other type or kind of information may be included in the datagram 109 and/or header 108 or such a datagram 109.

The multiple storage rings 109 of the network 100 may be interconnected. Such connection may be made through one or more hosts 104 within a respective one of the rings 109 which may operate as a bridge or gateway 106 between connected ones of the rings 109. Storage rings 109 may be divided into distributed clusters based upon the information 112 contained within the ring 109. The bridges or gateways 106 between rings 109 may divide and distribute the datagrams 109 based upon their unique identifiers in their headers 108.

Each of the datagrams 109 may be stored with a given one of the hosts 104 within a given one of the storage rings 109. Alternatively, or additionally, each of the datagrams 109 may be stored in every one of the hosts 104 within a given one of the storage rings 109. Alternatively, or additionally, each of the datagrams 109 may be continually circulated through one or more of the storage rings 109, but not stored specifically with one of the hosts 104 of a given one of the rings 109. Data and information 112 introduced to the network 100 may travel through the multiple rings 109 and/or be passed through one or more bridges and gateways 109 until the data 112 reaches a storage ring 109 that contains information and/or has a similar identifier classification in the header 108. Once reaching an appropriate storage ring 109, the data and information 112 may be stored or otherwise preserved.

A request for information may be introduced to the network 100 at any host 104. A request for information may utilize the identifier to allow correct selection of appropriate information 112. The request for information may travel some or all of the network 100 using the same method provided for the storage and preservation of information 112. Once the request reaches a storage ring 109 that contains the information 112, it may be responded to. A single host member 104 of the storage ring 109 may be selected at random to respond to the request for information. Alternatively, a predetermined member 104 of the storage ring 109 may respond to the request for information. Alternatively, the response to the request may be transmitted to another member 104 of the network 100 that will respond.

In exemplary embodiments, each of said number of confederate host computers 104 is configured to use a blind bounce back technique for transmitting the datagrams 109 and/or data 112 between said number of confederate host computers 104, including to and from the bridging host computers 106. The blind bounce back technique may comprise generating a further datagram 109 comprising said respective one of said payloads 112, wherein said further datagram 109 comprises a destination address 115 of a blind host computer and a source address 117 of said next one of said number of confederate host computers 104. The further datagram 109 may be configured to generate an error after receipt at the blind host computer. The modified datagram 109 may be sent to the blind host computer such that the blind host computer generates the error after receipt and transmits an error message comprising the respective one of said payloads 112 to said next one of said number of confederate host computers 104 identified in the source address 117 of the generated datagram 109.

The modified datagram 109 may be configured to generate said error message by setting a time to live value 119 at a value less than a number of gateways between the transmitting one of said number of confederate host computers 104 and said blind host computer. Alternatively, or additionally, the modified datagram 109 may be configured to generate said error message by indicating in the modified datagram 109 that more fragments of a larger transmission are forthcoming and not transmitting further fragments. Such indication may be made at the flags 113, the total length 114, and/or fragment offset sections 121 of the header 108 or other portion of the datagram 109.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A method for distributing data within a network for long-term storage, said method comprising the steps of:
organizing a number of confederate host computers into a number of rings, wherein each of said number of rings is associated with one of a number of ring identifiers, and wherein said number of rings are interconnected by one or more bridging confederate host computers;

receiving data payloads at one or more of said number of confederate host computers, wherein each of said data payloads is associated with an identifier;

routing each respective one of said data payloads to a respective one of said number of rings associated with a respective one of said ring identifiers matching the identifier of said respective one of said data payloads for storage;

storing each respective one of said data payloads in the respective one of said number of rings associated with the respective one of said ring identifiers matching the identifier of said respective one of said data payloads;

receiving a retrieval request for a given subset of said data payloads;

circulating said retrieval request about each of said number of rings until said subset of said data payloads is identified; and transmitting said subset of said data payloads to an address in said retrieval request using a blind bounce back technique which forwards said subset of said data payloads to one or more blind hosts by way of one or more datagrams listing a source address as the address, wherein said one or more datagrams are configured to trigger one or more errors at the one or more blind hosts.

2. The method of claim 1 wherein:

the step of routing each respective one of said data payloads comprises the sub-steps of:

circulating said data payloads about one or more of said number of rings;

identifying certain ones of said data payloads in a given one of said number of rings associated with identifiers not matching said ring identifier for said given one of said number of rings; and passing said certain ones of said data payloads from said given one of said number of rings to a connected one of said number of rings by way of a given one of said bridging confederate host computers;

wherein the blind bounce back technique is utilized for the circulation and passing of said data payloads which forwards said data payloads to the confederate hosts and bridging confederate hosts by way of blind hosts and datagrams configured to generate errors at the blind hosts.

3. The method of claim 1 wherein:

said identifiers comprise a type, use, and length for the data payload.

4. The method of claim 3 wherein:

said identifiers comprise a verification mechanism for verifying the integrity of the data payload.

5. The method of claim 1 wherein:

each of said number of bridging confederate host computers connects one of said number of rings to only one other one of said number of rings.

6. The method of claim 1 wherein:

each respective one of said data payloads is stored at a particular one of said number of confederate host computers in said respective one of said number of rings.

7. The method of claim 1 wherein:

each respective one of said data payloads is stored at each of said number of confederate host computers in said respective one of said number of rings.

8. The method of claim 1 wherein:

each respective one of said data payloads is stored within said respective one of said number of rings by continuously circulating said respective one of said data payloads through said respective one of said number of rings using a blind bounce back technique which forwards said data payloads to the confederate hosts of the respective one of the number of rings way of blind hosts and data rams configured to generate errors at the blind hosts.

9. The method of claim 1 further comprising the steps of:

assigning each respective one of said data payloads a respective one of said identifiers, wherein a same one of said identifiers is assigned to each of said data payloads comprising related information.

10. The method of claim 1 further comprising the steps of:

assigning a random one of said number of confederate host computers to transmit said given one of said data payloads to said address in said retrieval request.

11. The method of claim 1 further comprising the steps of:

tasking a predetermined one of said number of confederate host computers with transmitting said given one of said data payloads to said address in said retrieval request.

12. A system for distributing data within a network for long-term storage, said system comprising:

a number of confederate host computers arranged into a number of rings, wherein each of said number of rings is connected to at least one other one of said number of rings by a bridging confederate host computer, wherein each of said number of confederate host computers is configured to transmit datagrams comprising payloads to a next one of said confederate host computers in a respective one of said number of rings, and wherein said bridging confederate host computer is configured to:

receive a given one of said datagrams comprising a given one of said payloads;

identify a destination of one of said number of rings from an identifier in a header of said given one of said datagrams;

transmit said given one of said payloads to a next one of said confederate host computer in a current one of said number of rings where the identifier in the header of said given one of said datagrams matches an identifier for said current one of said number of rings; and transmit said given one of said payloads to a next one of said confederate host computer in a connected one of said number of rings where the identifier in the header of said given one of said datagrams does not match the identifier for said current one of said number of rings;

wherein each of said number of confederate host computers is configured to use a blind back technique for transmitting said datagrams between said number of confederate host computers;

wherein said blind bounce back technique comprises:

generating a further datagram comprising said respective one of said payloads, wherein said further datagram comprises a destination address of a blind host computer and a source address of said next one of said number of confederate host computers, and wherein said further datagram is configured to generate an error after receipt at said blind host computer; and transmitting said generated datagram to said blind host computer such that said blind host computer generates the error after receipt and transmits an error message comprising the respective one of said payloads to said next one of said number of confederate host computers identified in said source address of said generated datagram.

13. The system of claim 12 wherein:
said generated datagram is configured to generate said error message by setting a time to live value at a value less than a number of gateways between the transmitting one of said number of confederate host computers and said blind host computer.

14. The system of claim 12 wherein:
said generated datagram is configured to generate said error message by indicating in said generated datagram that more fragments of a larger transmission are forthcoming and not transmitting further fragments.

15. The system of claim 12 further comprising:
a requesting computer configured to generate a retrieval request for a particular one of said payloads and transmit the retrieval request to one of said number of confederate host computers, wherein each of said number of confederate host computers is configured to transmit said retrieval request about said number of rings until said particular one of said payloads is found, and wherein a certain one of said number of confederate host computers in possession of said particular one of said payloads is configured to transmit said particular one of said payloads to said requesting computer following receipt of said retrieval request, wherein said retrieval request comprises an identification of said certain one of said number of payloads and an address of said requesting computer.

16. The system of claim 12 further comprising:
a transmitting computer configured to generate a storage request for a new one of said payloads and transmit the storage request to one of said number of confederate host computers, wherein said storage request comprises said new one of said payloads.

17. The system of claim 12 wherein:
said number of confederate host computers are configured to collectively utilize multiple different ones of said blind host computer;
each of said number of confederate host computers and each of said blind host computers is electronically connected to one another within said network;
said network is an IP network; and
each of said blind host computers operates under ICMP protocols.

18. The system of claim 12 wherein:
each of said number of confederate host computers associated with a payload is configured to store a copy of each of said payloads associated with said identifier matching said identifier for said current one of said number of rings.

19. A system for distributing data within a network for long-term storage, said system comprising:
confederate host computers electronically interconnected within said network in a manner which forms a number of rings, wherein each of said number of rings is associated with a storage ring identifier, and wherein each of a number of covert payloads is associated with one of said storage ring identifiers; and
bridging confederate host computers connecting each of said number of rings to at least one other one of said number of rings;
wherein said confederate host computers are configured to:
transmit a first one of said covert payloads about a first one of said number of rings to a first one of said bridging confederate host computers;
receive said first one of said covert payloads at said first one of said bridging confederate host computers forming part of said first one of said number of rings and a second one of said number of rings;
if said storage ring identifier associated with said first one of said covert payloads matches the storage ring identifier for said first one of said number of rings, transmit said first one of said covert payloads to a next one of said confederate host computers in said first ring; and
if said storage ring identifier associated with said first one of said covert payloads does not match the storage ring identifier for said first one of said number of rings, transmit said one of said covert payloads to a next one of said confederate host computers in said second ring;
wherein:
each of said confederate host computers is configured to utilize a blind bounce back technique;
said network is an IP network; and
said blind bounce back technique comprises:
generating a datagram comprising a respective one of said covert payloads, wherein said datagram comprises a destination address of a blind host computer and a source address of said next one of said number of confederate host computers, and wherein said datagram is configured to generate an error after receipt at said blind host computer; and
transmitting said generated datagram to said blind host computer such that said blind host computer generates the error after receipt and transmits an error message comprising the respective one of said covert payloads to said next one of said number of confederate host computers identified in said source address of said generated datagram;
said generated datagram is configured to generate said error message by indicating in said generated datagram that more fragments of a larger transmission are forthcoming and not transmitting further fragments.

\* \* \* \* \*

UNITED STATES PATENT AND TRADEMARK OFFICE
CERTIFICATE OF CORRECTION

| | |
|---|---|
| PATENT NO. | : 11,516,048 B2 |
| APPLICATION NO. | : 17/126175 |
| DATED | : November 29, 2022 |
| INVENTOR(S) | : John Rankin |

It is certified that error appears in the above-identified patent and that said Letters Patent is hereby corrected as shown below:

In the Specification

Column 2, Line 52, please delete "CBI" and insert -- $CB_1$ --.

In the Claims

Claim 8, Column 8, Line 5, please delete "data rams" and insert -- datagrams --.
Claim 12, Column 8, Line 52, please delete "blind back" and insert -- blind bounce back --.

Signed and Sealed this
Thirty-first Day of January, 2023

Katherine Kelly Vidal
*Director of the United States Patent and Trademark Office*